(12) United States Patent
Virochsiri et al.

(10) Patent No.: US 10,032,047 B2
(45) Date of Patent: *Jul. 24, 2018

(54) USER SEARCH BASED ON PRIVATE INFORMATION

(71) Applicant: Facebook, Inc., Menlo Park, CA (US)

(72) Inventors: Kittipat Virochsiri, San Mateo, CA (US); Sriram Sankar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/879,952

(22) Filed: Oct. 9, 2015

(65) Prior Publication Data

US 2016/0034716 A1 Feb. 4, 2016

Related U.S. Application Data

(63) Continuation of application No. 13/651,734, filed on Oct. 15, 2012, now Pat. No. 9,203,925.

(51) Int. Cl.
| | |
|---|---|
| *G06F 15/16* | (2006.01) |
| *G06F 21/62* | (2013.01) |
| *H04L 29/08* | (2006.01) |
| *G06F 17/30* | (2006.01) |
| *H04L 29/06* | (2006.01) |
| *H04W 4/21* | (2018.01) |

(52) U.S. Cl.
CPC .... *G06F 21/6254* (2013.01); *G06F 17/30864* (2013.01); *G06F 17/30867* (2013.01); *G06F 21/6227* (2013.01); *G06F 21/6263* (2013.01); *H04L 65/403* (2013.01); *H04L 67/306* (2013.01); *H04W 4/21* (2018.02)

(58) Field of Classification Search
CPC ......... G06Q 50/01; H04L 51/32; H04L 67/30; H04L 67/306; H04L 63/10; H04W 48/02; H04W 12/00; H04W 12/02; H04W 12/08; G06F 17/30; G06F 17/30864; G06F 17/30867; G06F 21/6245
See application file for complete search history.

(56) References Cited

U.S. PATENT DOCUMENTS

| | | | | |
|---|---|---|---|---|
| 2002/0059201 | A1* | 5/2002 | Work | G06Q 10/10 |
| 2010/0280904 | A1* | 11/2010 | Ahuja | G06Q 30/02 |
| | | | | 705/14.58 |
| 2013/0086225 | A1* | 4/2013 | Gay | G06Q 10/10 |
| | | | | 709/219 |
| 2013/0254213 | A1* | 9/2013 | Cheng | G06Q 50/01 |
| | | | | 707/748 |
| 2014/0082568 | A1* | 3/2014 | Hulet | G06Q 50/01 |
| | | | | 715/853 |

\* cited by examiner

*Primary Examiner* — Brian J Gillis
*Assistant Examiner* — Austin Moreau
(74) *Attorney, Agent, or Firm* — Baker Botts L.L.P.

(57) ABSTRACT

In one embodiment, a method includes receiving, from a first user, a query specifying one or more criteria; accessing a data store comprising information associated with one or more users of a social-networking system; identifying a second user from a plurality of users of the social-networking system based on private information stored in the data store and the one or more criteria, wherein the private information is not viewable by the first user; and sending, to the first user, substitute information associated with the second user in place of the private information, the substitute information being information that is viewable by the first user.

33 Claims, 6 Drawing Sheets

500

Mary Smith ⌒ 510

...

Mary Jones ⌒ 520
wife of Michael Smith

Mary Clark ⌒ 530
friend of David Smith

...

US 10,032,047 B2

USER SEARCH BASED ON PRIVATE INFORMATION

PRIORIT

This application is a continuation under 35 U.S.C. § 120 of U.S. patent application Ser. No. 13/651,734, filed 15 Oct. 2012.

TECHNICAL FIELD

This disclosure generally relates to searching for and locating users who satisfy one or more criteria

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include social and family connections, demographic information, communication-channel information, and information on personal interests of the user. A user may query the social-networking system to search for other users who satisfy some criteria (e.g., in order to locate families or friends).

SUMMARY OF PARTICULAR EMBODIMENTS

In particular embodiments, upon receiving a query that specifies a given name and a surname, a social-networking system searches among its users to locate those specific users such that each located user's given name and surname, according to the user's profile at the social-networking system, match the given name and surname specified in the query respectively. In addition, the social-networking system also locates those specific users where each located user's given name matches the given name specified in the query, but whose surname does not match the surname specified in the query, and yet who has at least one family connection whose surname matches the surname specified in the query.

In particular embodiments, upon receiving a query that specifies one or more criteria, a social-networking system searches among its users to locate those specific users who satisfy the criteria based on information associated with each user stored in the social-networking system. The information associated with each user may include public or private information of the user (e.g., as specified by the user's privacy settings). If the private information of a user is used while determining whether the user satisfies the criteria, the private information of the user is obfuscated (e.g., with suitable substitute information) if and when the user is presented in order to protect the user's privacy.

DESCRIPTION OF EXAMPLE EMBODIMENTS

A social-networking system may have any number of users. Each user may have associated information (e.g., friend and family connections, demographic and background information, hobbies and interests, activates, communications, etc.) stored in the social-networking system. The social-networking system may search for and locate specific users based on the user information stored therein.

Figure 1:
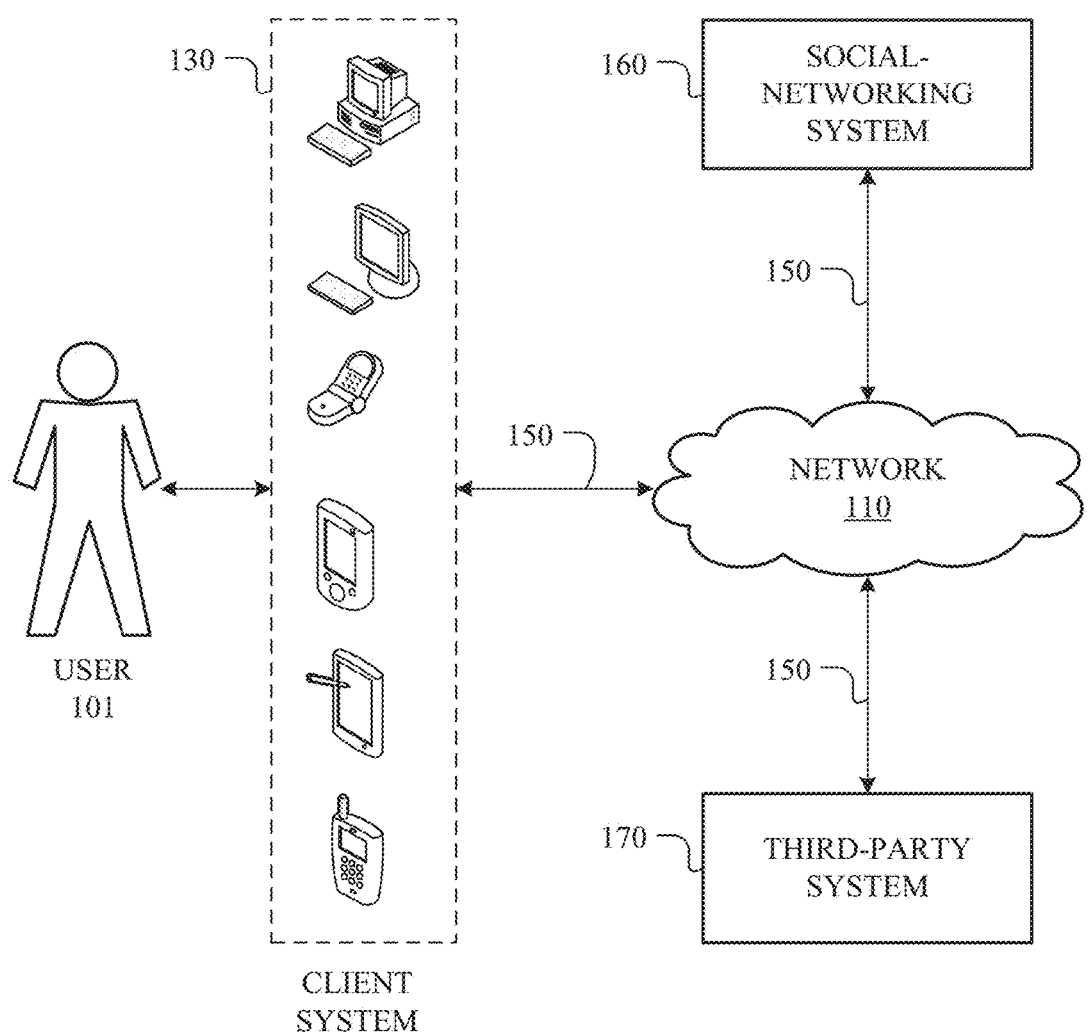
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various types of applications. Third-party system 170 may generate, store, receive, and transmit various types of data, such as, for example, data associated with the applications hosted by third-party system 170. Third-party system 170 may be accessed by the other components of network environment 100 either directly or via network 110. In particular embodiments, one or more users 101 may use one or more client systems 130 to access, send data to, and receive data from social-networking system 160 or third-party system 170.

Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Social-networking system 160 may store various types of information, including information associated with its users. For example, each user of social-networking system 160 may have a user profile. Each user may also upload data to social-networking system 160 for storage, communicate through social-networking system 160, perform activates in connection with social-networking system 160, and so on. In particular embodiments, the information may be stored in a graph structure, commonly referred to as a "social graph".

Figure 2:
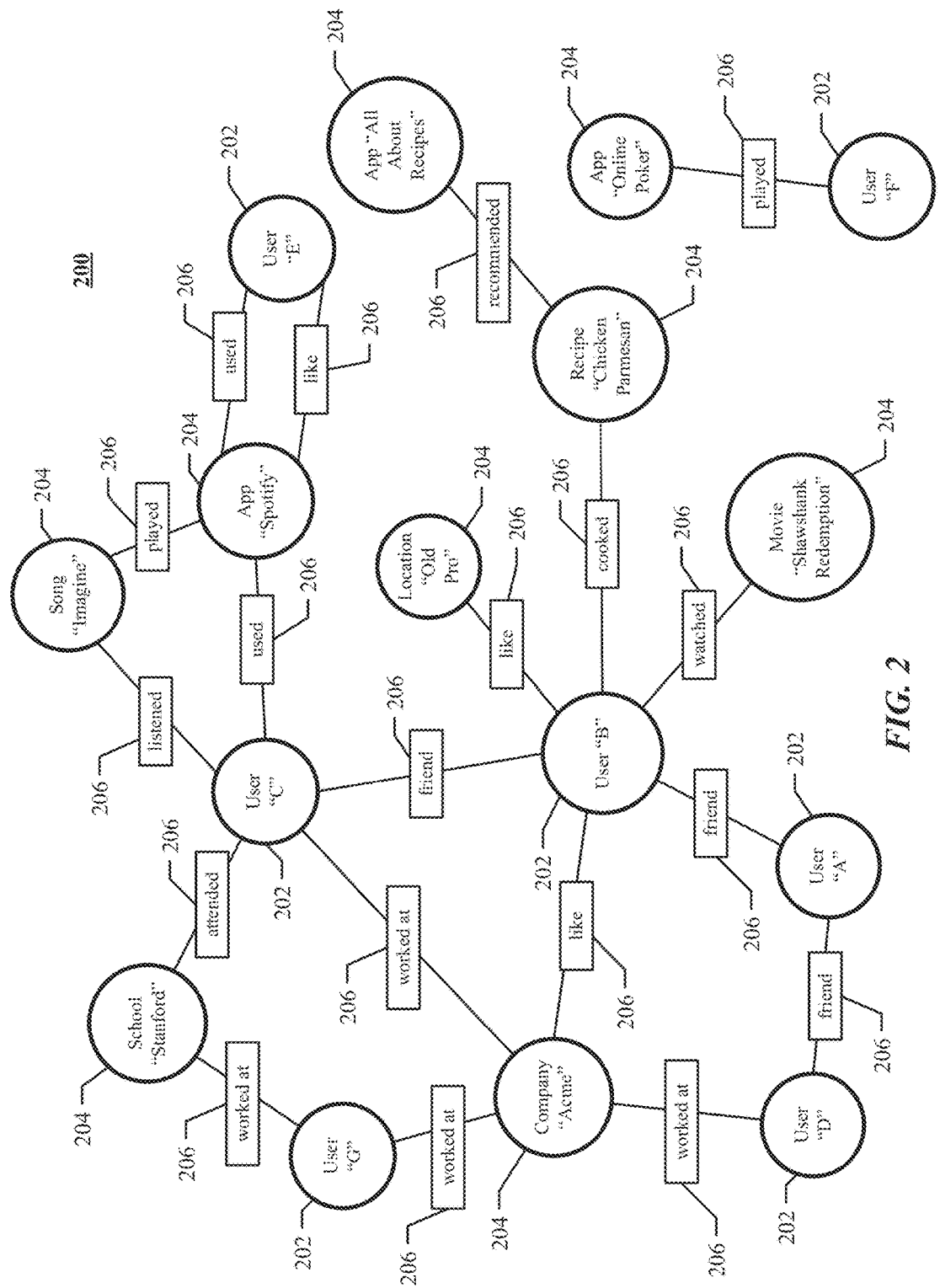
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores (e.g., data stores associated with social-networking system 160). In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

One feature supported by social-networking system 160 is to enable its users searching for other users in order to, for example, form social connections. This is especially helpful when users wish to reconnect with friends and families with whom they have lost contact as time passes. For example, suppose that a small group of users wishes to organize a high school class reunion and thus needs to locate other people from their class. However, they have not kept in touch with some of their classmates since graduation. Now ten years have passed and they need to locate their long-lost classmates. They may try to find their classmates through social-networking system 160, as their classmates may also belong to the same social-networking system 160.

A first user may try to locate a second user through social-networking system 160 by sending a query to social-networking system 160 with the name (e.g., given name and surname) of the second user whom the first user is looking for. For example, the first user may send the name "Mary Smith" to social-networking system 160. In response, social-networking system 160 may present the first user with a list of users (i.e., the search result) whose names are "Mary Smith". The first user may then try to locate the right "Mary Smith" who is actually the second user the first user is looking for.

Sometimes, people may change their names due to various reasons. For example, a woman may change her surname to her husband's surname upon marriage. In some states, such as California (based on the Name Equality Act of 2007), a husband may also change his surname to his wife's surname upon marriage. A person may change his or her given name or surname through proper court proceedings or upon becoming a naturalized citizen of the United States. Name change may cause problems, in some cases, when a first user is trying to locate a second user by name.

As an example, suppose that during the time period when the first user and the second user had lost contact with each other, the second user, whose maiden name is "Mary Smith", has gotten married and consequently has changed her name to "Mary Clark", as her husband's name is "Thomas Clark". In this case, the second user's current profile with social-networking system 160 actually has the name of the second user as "Mary Clark". On the other hand, since the first user is unaware of the second user's marriage and name change, the first user still believes the second user's name is "Mary Smith" (i.e., the second user's maiden name). In this case, when the first user searches for the second user using the name "Mary Smith", social-networking system 160 may not include the user whose name is "Mary Clark", as indicated by the second user's profile with social-networking system 160, in the list of users presented to the first user. As a result, the first user is unable to find the second user using the name "Mary Smith".

As another example, suppose that the second user has gotten married and consequently has changed her name to "Mary Smith", as her husband's name is "Michael Smith". However, the profile of the second user with social-networking system 160 still has her name as "Mary Jones", which is the second user's maiden name (e.g., the second user has not or does not want to update her profile with social-networking system 160 after her marriage). Further suppose that the first user does not know the second user's maiden name (e.g., because the first user has met the second user after the second user's marriage) but only knows the second user by the name "Mary Smith". In this case, when the first user searches for the second user using the name "Mary Smith", social-networking system 160 may not include the user whose name is "Mary Jones", as indicated by the second user's profile with social-networking system 160, in the list of users presented to the first user. As a result, again the first user is unable to find the second user using the name "Mary Smith".

Figure 3:
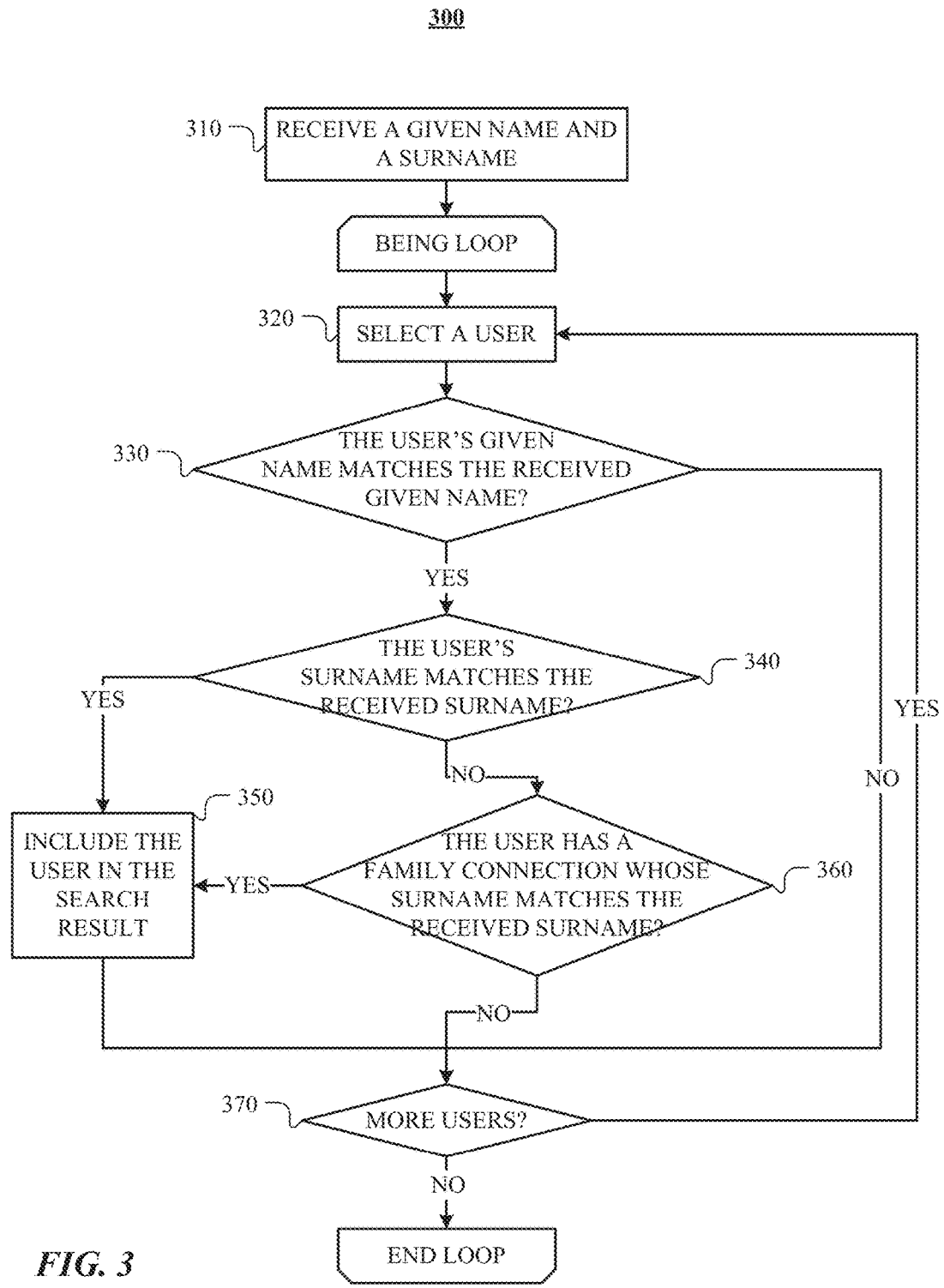
FIG. 3 illustrates an example method for locating users based on family connections.

In particular embodiments, social-networking system 160 may take into account each user's social connections, and especially family connections, when locating users who match a specific name. FIG. 3 illustrates an example method 300 for locating users based on family connections.

Method 300 may begin at STEP 310, where a name, including a given name (e.g., first name or Christian name) and a surname (e.g., last name or family name), is received by social-networking system 160. The name may be submitted by a user of social-networking system 160 in an attempt to find another user of social-networking system 160 who matches that name. In response, one or more users of social-networking system 160 matching the received name may be located.

In particular embodiments, social-networking system 160 may examine information associated with each of its users to locate those specific users whose names (e.g., according to each user's profile name) match the name received by social-networking system 160 at STEP 310. This may be done iteratively (e.g., in a loop). During each iteration, STEPS 320-370 may be performed to examine one particular user of social-networking system 160.

At STEP 320, a user (e.g., User X, for purpose of clarification), who has not been examined, is selected. For example, a temporary flag or marker may be associated with each user of social-networking system 160 to indicate whether a particular user has already been examined. With some implementations, the marker may be represented as a Boolean variable. Initially, the markers associated with all the users are set to FALSE. After a user has been examined, the marker associated with that user is set to TRUE. The marker thus indicates whether an associated user has been examined. The given name and surname of User X may be determined based on User X's profile (i.e. User X's profile name) with social-networking system 160.

At STEP 330, User X's given name, from User X's profile name, is compared against the given name received by social-networking system 160 at STEP 310. If User X's given name matches the received given name, then method 300 proceeds to STEP 340. Otherwise, method 300 process to STEP 370.

At STEP 340, User X's surname, from User X's profile name, is compared against the surname received by social-networking system 160 at STEP 310. If User X's surname matches the received surname, then method 300 proceeds to STEP 350. Otherwise, method 300 process to STEP 360.

At STEP 350, User X is included in a list of users (i.e., the search result). All the users on this list are considered to match (i.e., satisfy) the name received by social-networking system 160 at STEP 310.

At STEP 360 (i.e., when User X's given name matches the received given name but User X's surname does not match the received surname), User X's social connections, and especially family connections, are examined. With some implementations, a user's family connections may include, for example and without limitation, the user's parent (e.g., father, mother), step parent, sibling (e.g., brother, sister), child (e.g., son, daughter), or spouse (e.g., husband, wife). User X's social or family connections may be determined from User X's profile with social-networking system 160 or from information stored in social graph 200. The surnames of User X's family connections are compared against the surname received by social-networking system 160 at STEP 310. If the surname of at least one of User X's family connections matches the received surname, then method 300 proceeds to STEP 350, where User X is included in the search result (i.e., the list of users). Otherwise, method 300 process to STEP 370.

In the first example scenario described above, where the second user "Mary Smith" has married "Thomas Clark" and changed her name to "Mary Clark", and where the second user's profile name with social-networking system 160 is now "Mary Clark", suppose that the first user submits the name "Mary Smith" to social-networking system 160. In this case, based on the second user's profile name, the second user's given name (i.e., "Mary") matches the received given name, but the second user's surname (i.e., "Clark") does not match the received surname (i.e., "Smith"). However, further suppose that the second user's family connections (e.g., as indicated in the second user's profile with social-networking system 160) include the second user's father whose name is "David Smith" or the second user's brother whose name is "Kevin Smith". The surname (i.e., "Smith") of the second user's father or brother matches the received surname. As a result, the second user is still included in the search result for "Mary Smith" at STEP 350 even though the surname (i.e., "Clark") of her own current profile name does not match the received surname (i.e., "Smith").

In the second example scenario described above, where the second user "Mary Jones" has married "Michael Smith", and where the second user's profile name with social-networking system 160 is still her maiden name "Mary Jones", suppose that the first user submits the name "Mary Smith" to social-networking system 160. In this case, based on the second user's profile name, the second user's given name (i.e., "Mary") matches the received given name, but the second user's surname (i.e., "Jones") does not match the received surname (i.e., "Smith"). However, further suppose that the second user's family connections (e.g., as indicated in the second user's profile with social-networking system 160) include the second user's husband whose name is "Michael Smith". The surname (i.e., "Smith") of the second user's husband matches the received surname. As a result, the second user is still included in the search result for "Mary Smith" at STEP 350 even though the surname (i.e., "Jones") her current profile name does not match the received surname (i.e., "Smith").

As these two examples illustrate, even when User X's surname, from User X's profile name at social-networking system 160, does not match the surname received by social-networking system 160 at STEP 310, if User X has at least one family connection whose surname matches the received surname, User X may still be included in the search result.

At STEP 370, if there are more users who have not been examined, the loop repeats for another iteration, starting again at STEP 320 to select another user who has not been examined. Otherwise, the loop ends.

The search result (e.g., a list of users) obtained using method 300 includes two types of users. First, based on a user's profile name at social-networking system 160, each user whose given name matches the given name specified in the search query and whose surname matches the surname specified in the search query is included in the search result.

Second, based on a user's profile name and family connections at social-networking system 160, each user whose given name matches the specified given name but whose surname does not match the specified surname and who has at least one family connection whose surname matches the specified surname is included in the search result. All other users are not included in the search result. Subsequently, the search result (e.g., the list of users) may be sent to and presented to the user requesting the search.

In particular embodiments, when presenting each user in the search result, the user's given name and surname, according to the user's profile name, are displayed. In addition, if one of the user's family connections is used during the search (e.g., to determine an alternative surname for the user), the user's family connection is also displayed. For example, the given name and surname of the user's family connection and the relationship (e.g., father, brother, husband, etc.) with the user may be displayed.

Figure 5:
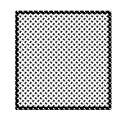
FIG. 5 illustrates an example search result.
Figure 5:
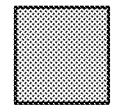
Figure 5:
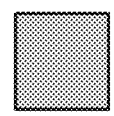

An example search result 500 for the example query "Mary Smith" is illustrated in FIG. 5, which includes several users. For example, user 510's profile name is "Mary Smith", which matches the name specified in the example query exactly (i.e., both given name and surname match). In this case, the family connections of user 510 are not used and thus are not displayed. On the other hand, user 520's profile name is "Mary Jones". User 520's given name matches the given name specified in the example query, but user 520's surname does not match the surname specified in the example query. However, user 520 is still included in the search result because she is the wife of "Michael Smith". In this case, the relevant family connection of user 520 for the search is her husband. Thus, the name of her husband (i.e., "Michael Smith") and her relationship to "Michael Smith" (i.e., "wife") are also displayed.

In particular embodiments, a user of social-networking system 160 may provide many types of information concerning the user to social-networking system 160. Social-networking system 160 may in turn store the user's information in connection with the user (e.g., in the user's profile or in social graph 200). For example, a user's information may include, without limitation, the user's social and family connections (e.g., friends, colleagues, parents, siblings, children, spouse, etc.), demographic data (e.g., birth date, birth place, age, gender, marital status, family status, etc.), background data (e.g., education, employment, profession, residence, etc.), interests and hobbies, activities, etc.

In particular embodiments, to protect user privacy, social-networking system 160 may enable a user to specify (e.g., through privacy settings) which piece of the user's information the user is willing to share publicly and which piece of the user's information the user wishes to keep private (e.g., only the user himself or herself can view or only a specific list of other users, such as the user's friends, can view).

When displaying search result 500 as illustrated in FIG. 5, for user 520 (i.e., profile name "Mary Jones", wife of "Michael Smith"), the family connection used for the search is her husband. Suppose that user 520 has set this piece of information (i.e., the husband-wife connection) "public" so that anyone can obtain this piece of information. Therefore, it does not violate user 520's privacy settings to display the name of user 520's husband (i.e., "Michael Smith") and the relationship (i.e., husband and wife) between them.

On the other hand, for user 530 (i.e., profile name "Mary Clark", daughter of "David Smith"), the family connection used for the search is her father. Suppose that user 530 has set this piece of information (i.e., the father-daughter connection) "private" so that it should not be shared with the general public. It would violate user 530's privacy settings to display the relationship (i.e., father and daughter) between user 530 and her father (i.e., "David Smith"). Instead, in particular embodiments, a substitute relationship (e.g., friend) may be displayed to obfuscate the private father-daughter relationship and to protect user 530's privacy, as illustrated in FIG. 5.

Figure 4:
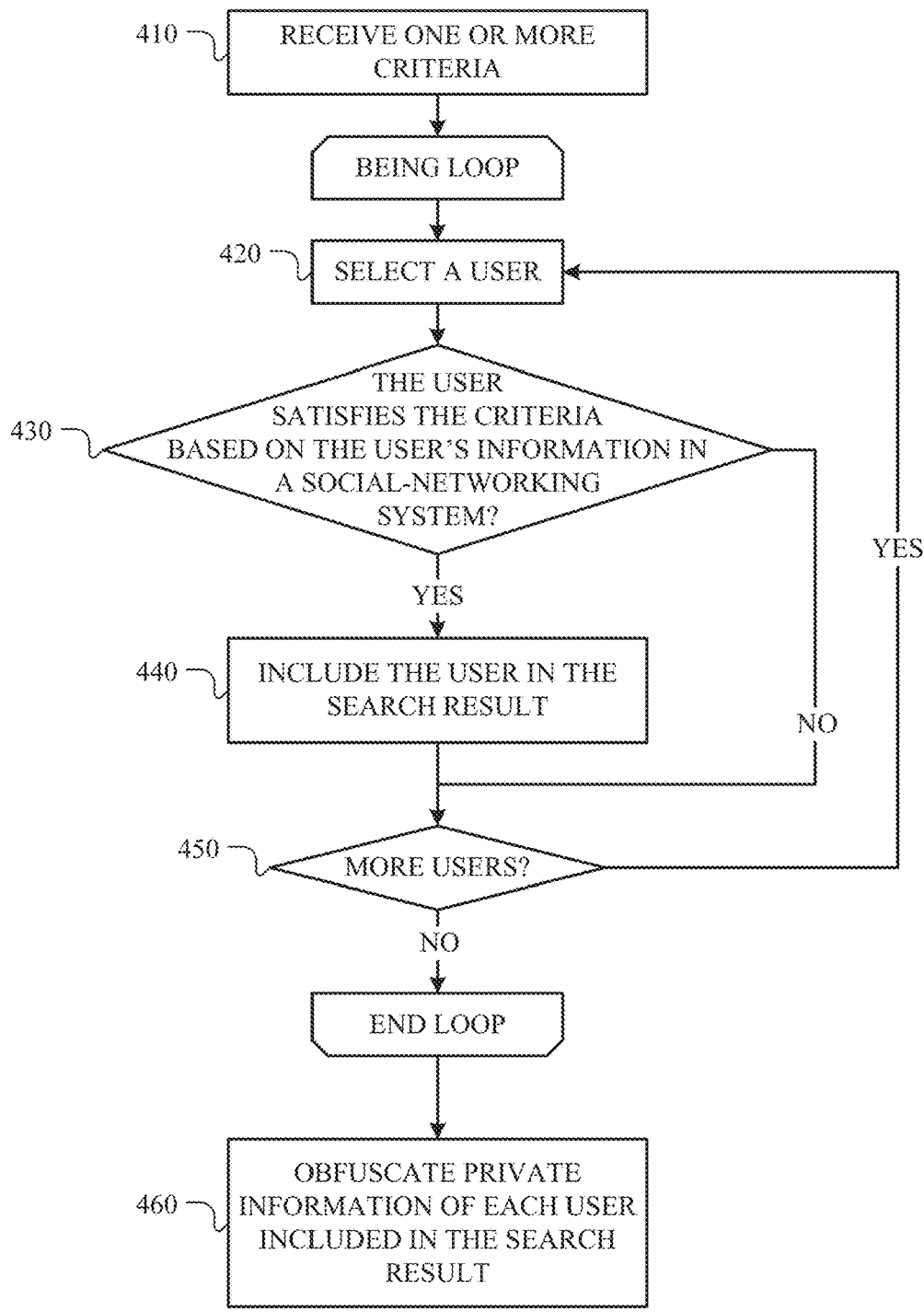
FIG. 4 illustrates an example method for locating users based information stored in a social-networking system.

Family connections are not the only type of user information that may be used to locate specific users in social-networking system 160. In particular embodiments, any available user information, public or private, may be used during a user search process. FIG. 4 illustrates an example method 400 for locating users based information stored in a social-networking system.

Method 400 may begin at STEP 410, where one or more criteria are received by social-networking system 160. The criteria may be submitted by a user of social-networking system 160 in an attempt to find one or more other users of social-networking system 160 who satisfy these criteria. The search criteria may include any type of user information, such as, for example and without limitation, name (e.g., given name or surname or both), age, location (e.g., residential city or state), profession, or employment (e.g., employer's name). In response, one or more users of social-networking system 160 satisfying the criteria may be located.

In particular embodiments, social-networking system 160 may examine available information associated with each of its users to locate those specific users who satisfy the criteria received by social-networking system 160 at STEP 410. This may be done iteratively (e.g., in a loop). During each iteration, STEPS 420-450 may be performed to examine one particular user of social-networking system 160.

At STEP 420, a user (e.g., User X, for purpose of clarification), who has not been examined, is selected. For example, a temporary flag or marker may be associated with each user of social-networking system 160 to indicate whether a particular user has already been examined. With some implementations, the marker may be represented as a Boolean variable. Initially, the markers associated with all the users are set to FALSE. After a user has been examined, the marker associated with that user is set to TRUE. The marker thus indicates whether an associated user has been examined. The information associated with User X may be obtained from User X's profile or social graph 200.

At STEP 430, available information of User X may be examined to determine whether User X satisfies the criteria received at STEP 410. With some implementations, only public information of User X (e.g., as determined based on User X's privacy settings) is used. Alternatively, with some implementations, both public and private information of User X (e.g., as determined based on User X's privacy settings) is use. If User X satisfies the received criteria, method 400 proceeds to STEP 440, where User X is included in the search result. Otherwise, method 400 proceeds to STEP 450.

As an example, suppose that the criteria received at STEP 410 include a name (e.g., "Mary Smith"). For user 530 (i.e., profile name "Mary Clark", daughter of "David Smith"), based on user 530's profile given name and user 530's family connection with her father (i.e., "David Smith"), user 530 satisfies the received search criteria. Thus, user 530 is included in the search result.

As another example, suppose that the criteria received at STEP 410 include a name (e.g., "Mary Smith") and a city (e.g., "San Francisco"). For user 510 (i.e., profile name "Mary Smith"), in addition to user 510's profile name, if user 510's information indicates that user 510 lives or works in "San Francisco", then user 510 satisfies the received search criteria and is included in the search result. On the other hand, if user 510's information indicates that user 510 has no connection or association with the city of "San Francisco", then user 510 does not satisfy the received search criteria and is not included in the search result.

As a third example, suppose that the criteria received at STEP 410 include a name (e.g., "Mary Smith") and a company (e.g., "Facebook"). For user 520 (i.e., profile name "Mary Jones", wife of "Michael Smith"), in addition to user 520's profile name and husband-wife family connection, if user 520's information indicates that user 520 works at "Facebook", then user 520 satisfies the received search criteria and is included in the search result. On the other hand, if user 520's information indicates that user 520 has no connection or association with the company "Facebook", then user 520 does not satisfy the received search criteria and is not included in the search result.

At STEP 440, User X is included in a list of users (i.e., the search result). All the users on this list are considered to satisfy the criteria received by social-networking system 160 at STEP 410, based on each user's available information, public or private, at social-networking system 160.

At STEP 450, if there are more users who have not been examined, the loop repeats for another iteration, starting again at STEP 420 to select another user who has not been examined. Otherwise, the loop ends. At the end of the loop, the search result (e.g., the list of users) includes those users who satisfy the criteria received by social-networking system 160 at STEP 410.

At STEP 460, the search result (e.g., the list of users) may be sent to and presented to the user requesting the search. In particular embodiments, when displaying the users in the search result, for each user, the profile name of the user is displayed. In addition, for the user's information that is relevant to the search criteria and used during the search, if a piece of information is publicly shared by the user (e.g., through privacy settings), the piece of information is displayed as it is, and if a piece of information is not publicly shared by the user, a substitute piece of information is displayed to obfuscate the user's private information and protect the user's privacy.

For example, as illustrated in FIG. 5, for user 520 (i.e., profile name "Mary Jones", wife of "Michael Smith"), the husband-wife connection of user 520 is relevant to the search criteria. Since user 520 publicly shares this piece of information (i.e., the husband-wife connection), the relationship between user 520 and her husband (i.e., "Michael Smith") is displayed as it is. On the other hand, for user 530 (i.e., profile name "Mary Clark", daughter of "David Smith"), the father-daughter connection of user 530 is relevant to the search criteria. However, since user 530 does not publicly share this piece of information (i.e., the father-daughter connection), the relationship between user 530 and her father (i.e., "David Smith") is not displayed. Instead, a substitute relationship (e.g., "friend") is displayed.

Suppose that there is a connection (e.g., family connection) between two users (e.g., User X and User Y, for purpose of clarification). User X may specify a privacy setting for this connection in User X's profile. Similarly, User Y may also specify a privacy setting for this same connection in User Y's profile, which may or may not be the same as User X's privacy setting for the connection. In particular embodiments, during a search for specific users based on one or more search criteria, if User X is the user being examined and the connection between Users X and Y is needed to determined whether User X satisfies the search criteria and should be included in the search result, User X's privacy setting for the connection controls and determines whether the connection needs to be obfuscated (e.g., when User X is displayed as a part of the search result). On the other hand, if User Y is the user being examined and the connection between Users X and Y is needed to determined whether User Y satisfies the search criteria and should be included in the search result, User Y's privacy setting for the connection controls and determines whether the connection needs to be obfuscated (e.g., when User Y is displayed as a part of the search result).

Thus, suppose that User X's privacy setting for the connection between Users X and Y is "public" and User Y's privacy setting for the connection between Users X and Y is "private". When User X is displayed as a part of the search result, if the connection is relevant to the search criteria, the connection is displayed as it is, without substitution, since User X's privacy setting for the connection is "public". On the other hand, when User Y is displayed as a part of the search result, if the connection is relevant to the search criteria, the connection is not displayed; instead, a substitute connection is displayed, since User Y's privacy setting for the connection is "private".

In particular embodiments, a more general public piece of information may be used to obfuscate a more specific private piece of information. A substitute piece of information for a private piece of information may be selected based on the private piece of information that needs to be obfuscated. For example, if the private piece of information is a family connection, the substitute piece of information may be a general social connection (e.g., "friend"). If the private piece of information is a location (e.g., a city), the substitute piece of information may be a more granular location (e.g., the state in which the city is located). If the private piece of information is a company, the substitute piece of information may be an industry to which the company's business belongs.

In particular embodiments, to obfuscate a user's private information, the search result may include one or more additional users who do not satisfy the search criteria themselves but who may be close friends to (e.g., have high coefficient with) the user whose private information needs to be protected. As an example, in FIG. 5, for user 530 (i.e., profile name "Mary Clark", daughter of "David Smith"), the father-daughter connection between user 530 and her father (i.e., "David Smith") is substituted with a "friend" connection. However, since search result 500 should include those users whose names are "Mary Smith", the fact that user 530 is included in search result 500 and the information that user 530 is "friend" of "David Smith" may suggest that user 530 has at least a family connection (e.g., possibly father-daughter or brother-sister connection) with "David Smith" and not just merely a "friend" of "David Smith". To further protect user 530's father-daughter connection with "David Smith", search result 500 may include one or more additional users, who have close relationships with user 530 but whose names are not necessarily "Mary Smith". These additional users may also be shown as "friends" of "David Smith" even if they have no actual connections with "David Smith", and thus further obfuscating or cloaking user 530 among them.

In particular embodiments, public information of the users may be used in place of a user's private information so that it is not necessary to use the user's private information during a search. As an example, suppose that a search query requests for users working at "Facebook". Further suppose that User X works at "Facebook" but User X has specified that his employer information is "private". With some implementations, if User X has a social connection with User Y, which is a "public" connection, and User Y also works at "Facebook", User X may be located by first locating User Y, who works at "Facebook", and then tracing the public connection from User Y back to User X after User Y has been located. In this case, User X's private information (i.e., his employer information) is not actually used during the search. In other words, in particular embodiments, a first user, who satisfies the search criteria, may be located by tracing the public connections from a second user back to the first user without using the first user's private information.

Particular embodiments may repeat one or more steps of the methods of FIGS. 3-4, where appropriate. Although this disclosure describes and illustrates particular steps of the methods of FIGS. 3-4 as occurring in a particular order, this disclosure contemplates any suitable steps of the methods of FIGS. 3-4 occurring in any suitable order. Moreover, although this disclosure describes and illustrates particular components, devices, or systems carrying out particular steps of the methods of FIGS. 3-4 this disclosure contemplates any suitable combination of any suitable components, devices, or systems carrying out any suitable steps of the methods of FIGS. 3-4.

Figure 6:
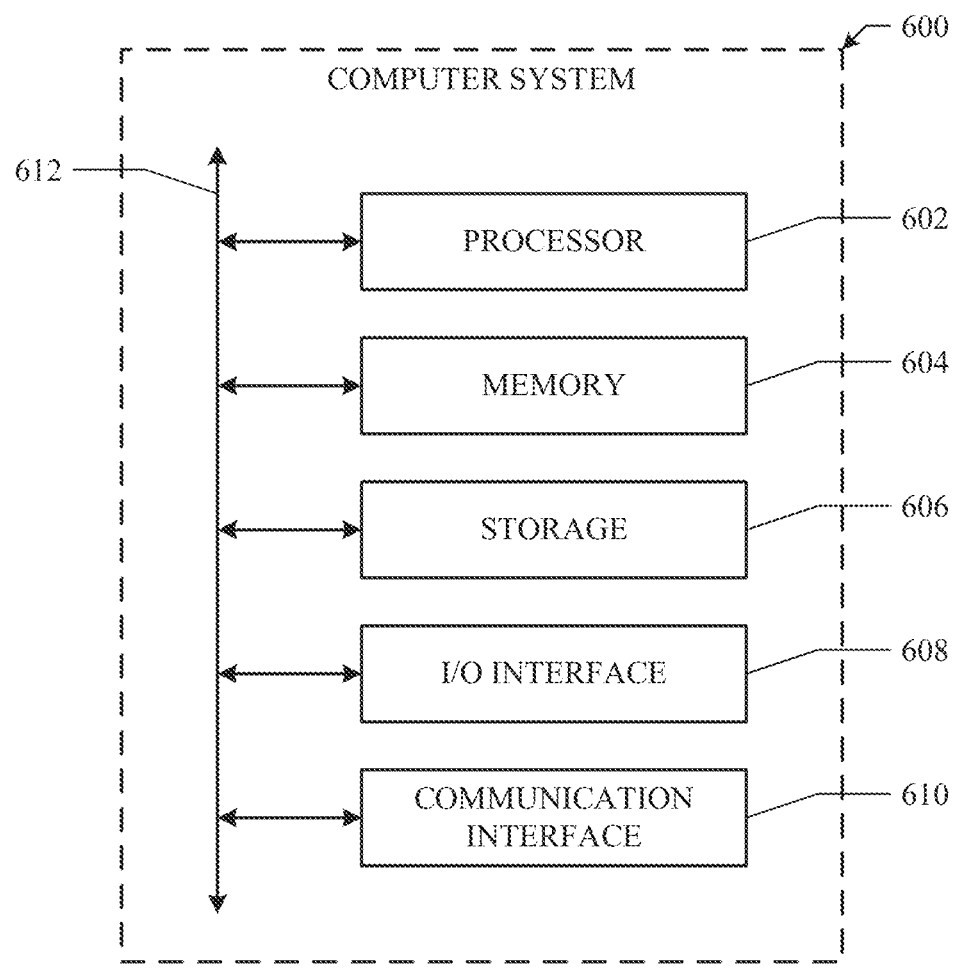
FIG. 6 illustrates an example computer system.

Methods 300 and 400 may be implemented as computer software and executed on a computer system. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
   receiving, at a social-networking system, a query from a client device of a first user specifying one or more criteria;
   accessing, by the social-networking system, a data store comprising information associated with one or more users of the social-networking system;
   identifying, by the social-networking system, a plurality of users of the social-networking system based on the query, wherein the plurality of users comprise:
      a second user identified based on private information stored in the data store and the one or more criteria, wherein the private information is not viewable by the first user; and
      a third user identified based on non-private information stored in the data store and the one or more criteria, wherein the non-private information is viewable by the first user, and wherein the third user is identified responsive to the identifying of the second user based on private information; and
   sending, to the client device of the first user, a plurality of search results responsive to the query, wherein the search results comprise information associated with at least the second and third users, and wherein the information associated with the second user comprises substitute information associated with the second user in place of the private information, the substitute information being information that is viewable by the first user.

2. The method of claim 1, further comprising:
   accessing a social graph comprising a plurality of nodes and a plurality of edges connecting the nodes, each of the edges between two of the nodes representing a single degree of separation between them, the nodes comprising:
      a first node corresponding to the first user; and
      a plurality of user nodes corresponding to the plurality of users of the online social network, respectively.

3. The method of claim 1, wherein the substitute information is public information.

4. The method of claim 1, wherein the private information comprises a relationship between the second user and a third user and the substitute information is a more generic relationship between the second user and the third user.

5. The method of claim 1, wherein the private information is deemed private based on a privacy setting specified by the second user, the privacy setting specifying that the private information is not viewable by the first user.

6. The method of claim 1, wherein the private information is deemed private based on a privacy setting specified by the second user, the privacy setting specifying that the private information is viewable only by a group of users, the group of users not including the first user.

7. The method of claim 1, wherein the private information comprises a relationship between the second user and a third user, the private information being deemed private based on a privacy setting specified by the third user, the privacy setting specifying that the private information is not viewable by the first user.

8. The method of claim 1, wherein the private information comprises a relationship between the second user and a third user, the private information being deemed private based on a privacy setting specified by the second user, the privacy setting specifying that the private information is not viewable by the first user.

9. The method of claim 1, wherein identifying the second user comprises:
   selecting a user from the plurality of users; and
   determining whether the selected user satisfies one or more of the criteria based on the private information.

10. The method of claim 1, wherein the third user does not satisfy the search criteria, and wherein the third user is a connection of the second user.

11. The method of claim 1, wherein the non-private information comprises public information, wherein the public information is information that is viewable by the general public.

12. The method of claim 1, wherein, for each of the plurality of users, the information of the user comprises one or more family connections of the user, one or more friend connections of the user, one or more demographic data of the user, or one or more one or more background data of the user.

13. The method of claim 12, wherein, for each of the plurality of users, the one or more family connections of the user comprise one or more of parent, sibling, child, or spouse.

14. The method of claim 12, wherein, for each of the plurality of users, the one or more demographic data of the user comprise one or more of birth date, birth place, age, gender, or marital status.

15. The method of claim 12, wherein, for each of the plurality of users, the one or more background data of the user comprise one or more of education, employment, or residence.

16. The method of claim 1, wherein the information associated with the third user is included in the search results to obfuscate the private information of the second user.

17. One or more computer-readable non-transitory storage media embodying software that is operable when executed to:
   receive a query from a client device of a first user specifying one or more criteria;
   access a data store comprising information associated with one or more users of the social-networking system;
   identify, by the social-networking system, a plurality of users of the social-networking system based on the query, wherein the plurality of users comprise:
      a second user identified based on private information stored in the data store and the one or more criteria, wherein the private information is not viewable by the first user; and
      a third user identified based on non-private information stored in the data store and the one or more criteria, wherein the non-private information is viewable by the first user, and wherein the third user is identified responsive to the identifying of the second user based on private information; and
   send, to the client device of the first user, a plurality of search results responsive to the query, wherein the search results comprise information associated with at least the second and third users, and wherein the information associated with the second user comprises substitute information associated with the second user in place of the private information, the substitute information being information that is viewable by the first user.

18. A system comprising: one or more processors; and a non-transitory memory coupled to the processors comprising instructions executable by the processors, the processors operable when executing the instructions to:
   receive a query from a client device of a first user specifying one or more criteria;
   access a data store comprising information associated with one or more users of the social-networking system;
   identify, by the social-networking system, a plurality of users of the social-networking system based on the query, wherein the plurality of users comprise:
      a second user identified based on private information stored in the data store and the one or more criteria, wherein the private information is not viewable by the first user; and
      a third user identified based on non-private information stored in the data store and the one or more criteria, wherein the non-private information is viewable by the first user, and wherein the third user is identified responsive to the identifying of the second user based on private information; and
   send, to the client device of the first user, a plurality of search results responsive to the query, wherein the search results comprise information associated with at least the second and third users, and wherein the information associated with the second user comprises substitute information associated with the second user in place of the private information, the substitute information being information that is viewable by the first user.

19. The system of claim 18, wherein the processors are further operable when executing the instructions to:
   access a social graph comprising a plurality of nodes and a plurality of edges connecting the nodes, each of the edges between two of the nodes representing a single degree of separation between them, the nodes comprising:
      a first node corresponding to the first user; and
      a plurality of user nodes corresponding to the plurality of users of the online social network, respectively.

20. The system of claim 18, wherein the substitute information is public information.

21. The system of claim 18, wherein the private information comprises a relationship between the second user and a third user and the substitute information is a more generic relationship between the second user and the third user.

22. The system of claim 18, wherein the private information is deemed private based on a privacy setting specified by the second user, the privacy setting specifying that the private information is not viewable by the first user.

23. The system of claim 18, wherein the private information is deemed private based on a privacy setting specified by the second user, the privacy setting specifying that the private information is viewable only by a group of users, the group of users not including the first user.

24. The system of claim 18, wherein the private information comprises a relationship between the second user and a third user, the private information being deemed private based on a privacy setting specified by the third user, the privacy setting specifying that the private information is not viewable by the first user.

25. The system of claim 18, wherein the private information comprises a relationship between the second user and a third user, the private information being deemed private based on a privacy setting specified by the second user, the privacy setting specifying that the private information is not viewable by the first user.

26. The system of claim 18, wherein the instructions to identify the second user comprises instructions to:
   select a user from the plurality of users; and
   determine whether the selected user satisfies one or more of the criteria based on the private information.

27. The system of claim 18, wherein the third user does not satisfy the search criteria, and wherein the third user is a connection of the second user.

28. The system of claim 18, wherein the non-private information comprises public information, wherein the public information is information that is viewable by the general public.

29. The system of claim 18, wherein, for each of the plurality of users, the information of the user comprises one or more family connections of the user, one or more friend connections of the user, one or more demographic data of the user, or one or more one or more background data of the user.

30. The system of claim 29, wherein, for each of the plurality of users, the one or more family connections of the user comprise one or more of parent, sibling, child, or spouse.

31. The system of claim 29, wherein, for each of the plurality of users, the one or more demographic data of the user comprise one or more of birth date, birth place, age, gender, or marital status.

32. The system of claim 29, wherein, for each of the plurality of users, the one or more background data of the user comprise one or more of education, employment, or residence.

33. The system of claim 18, wherein the information associated with the third user is included in the search results to obfuscate the private information of the second user.

* * * * *